(12) United States Patent
Patra et al.

(10) Patent No.: US 12,177,111 B2
(45) Date of Patent: Dec. 24, 2024

(54) MINIMIZING CUSTOMER IMPACT DURING ACCESS MIGRATIONS

(71) Applicant: AT&T Intellectual Property I, L.P., Atlanta, GA (US)

(72) Inventors: Subrat Patra, Schaumburg, IL (US); Abdulla Udaipurwala, Monroe Township, NJ (US); Ivetta Pogosova, Plainsboro, NJ (US); Fen Mei, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 7 days.

(21) Appl. No.: 17/805,535

(22) Filed: Jun. 6, 2022

(65) Prior Publication Data

US 2023/0396532 A1  Dec. 7, 2023

(51) Int. Cl.
*H04L 45/00* (2022.01)
*H04L 45/28* (2022.01)
*H04L 45/42* (2022.01)

(52) U.S. Cl.
CPC .............. *H04L 45/22* (2013.01); *H04L 45/28* (2013.01); *H04L 45/42* (2013.01)

(58) Field of Classification Search
CPC .......... H04L 45/22; H04L 45/28; H04L 45/42
See application file for complete search history.

(56) References Cited

U.S. PATENT DOCUMENTS

| 8,014,275 | B1* | 9/2011 | Sundt | H04L 41/0668 370/227 |
| 9,621,460 | B2* | 4/2017 | Mehta | H04L 45/74 |
| 9,692,729 | B1* | 6/2017 | Chen | H04L 45/04 |
| 2005/0117590 | A1* | 6/2005 | Ronneke | H04L 69/16 370/395.52 |
| 2006/0193247 | A1* | 8/2006 | Naseh | H04L 45/22 370/216 |
| 2006/0253485 | A1* | 11/2006 | Bangel | G06F 16/273 707/999.102 |
| 2009/0296568 | A1* | 12/2009 | Kitada | H04L 45/00 370/221 |
| 2012/0182862 | A1* | 7/2012 | Cirkovic | H04L 41/12 370/220 |
| 2014/0077956 | A1* | 3/2014 | Sampath | A61B 5/0022 340/573.1 |
| 2015/0312144 | A1* | 10/2015 | Gobriel | H04L 45/44 709/242 |

(Continued)

FOREIGN PATENT DOCUMENTS

WO   WO-2009098530 A1 *  8/2009  ......... H04L 29/1282

*Primary Examiner* — Chris Parry
*Assistant Examiner* — Dixon F Dabipi

(57) ABSTRACT

In one example, the present disclosure describes a device, computer-readable medium, and method for minimizing customer impact during network access migrations. For instance, in one example, a method includes detecting a change in an access network that affects a first network circuit connecting a customer premises to a first provider edge router and provisioning a second network circuit in response to the detecting, wherein the provisioning comprises taking an action to preserve a wide area network internet protocol address of the customer premises on the first network circuit in the second network circuit.

20 Claims, 10 Drawing Sheets

(56) References Cited

U.S. PATENT DOCUMENTS

2016/0164753 A1\* 6/2016 Cimprich .............. H04L 47/808
                                                          709/222
2017/0180196 A1\* 6/2017 Patel ..................... H04L 41/084
2017/0279664 A1\* 9/2017 Zhang .................... H04L 45/28

\* cited by examiner

MINIMIZING CUSTOMER IMPACT DURING ACCESS MIGRATIONS

The present disclosure relates generally to computer networks, and relates more particularly to devices, non-transitory computer-readable media, and methods for minimizing customer impact during network access migrations.

BACKGROUND

Network service providers are continuously trying to optimize network performance in order to improve customer quality of experience (QoE) while also reducing the costs of providing high quality service. Occasionally, network optimization may involve an access migration in which network access is migrated from old equipment to new equipment, normally in bulk for many customers at once. The migration may be part of an upgrade or an add-on to a network system.

SUMMARY

In one example, the present disclosure describes a device, computer-readable medium, and method for minimizing customer impact during network access migrations. For instance, in one example, a method includes detecting a change in an access network that affects a first network circuit connecting a customer premises to a first provider edge router and provisioning a second network circuit in response to the detecting, wherein the provisioning comprises taking an action to preserve a wide area network internet protocol address of the customer premises on the first network circuit in the second network circuit.

In another example, a non-transitory computer-readable medium stores instructions which, when executed by a processing system including at least one processor, cause the processing system to perform operations. The operations include detecting a change in an access network that affects a first network circuit connecting a customer premises to a first provider edge router and provisioning a second network circuit in response to the detecting, wherein the provisioning comprises taking an action to preserve a wide area network internet protocol address of the customer premises on the first network circuit in the second network circuit.

In another example, an apparatus includes a processing system including at least one processor and a non-transitory computer-readable medium storing instructions which, when executed by the processing system, cause the processing system to perform operations. The operations include detecting a change in an access network that affects a first network circuit connecting a customer premises to a first provider edge router and provisioning a second network circuit in response to the detecting, wherein the provisioning comprises taking an action to preserve a wide area network internet protocol address of the customer premises on the first network circuit in the second network circuit.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
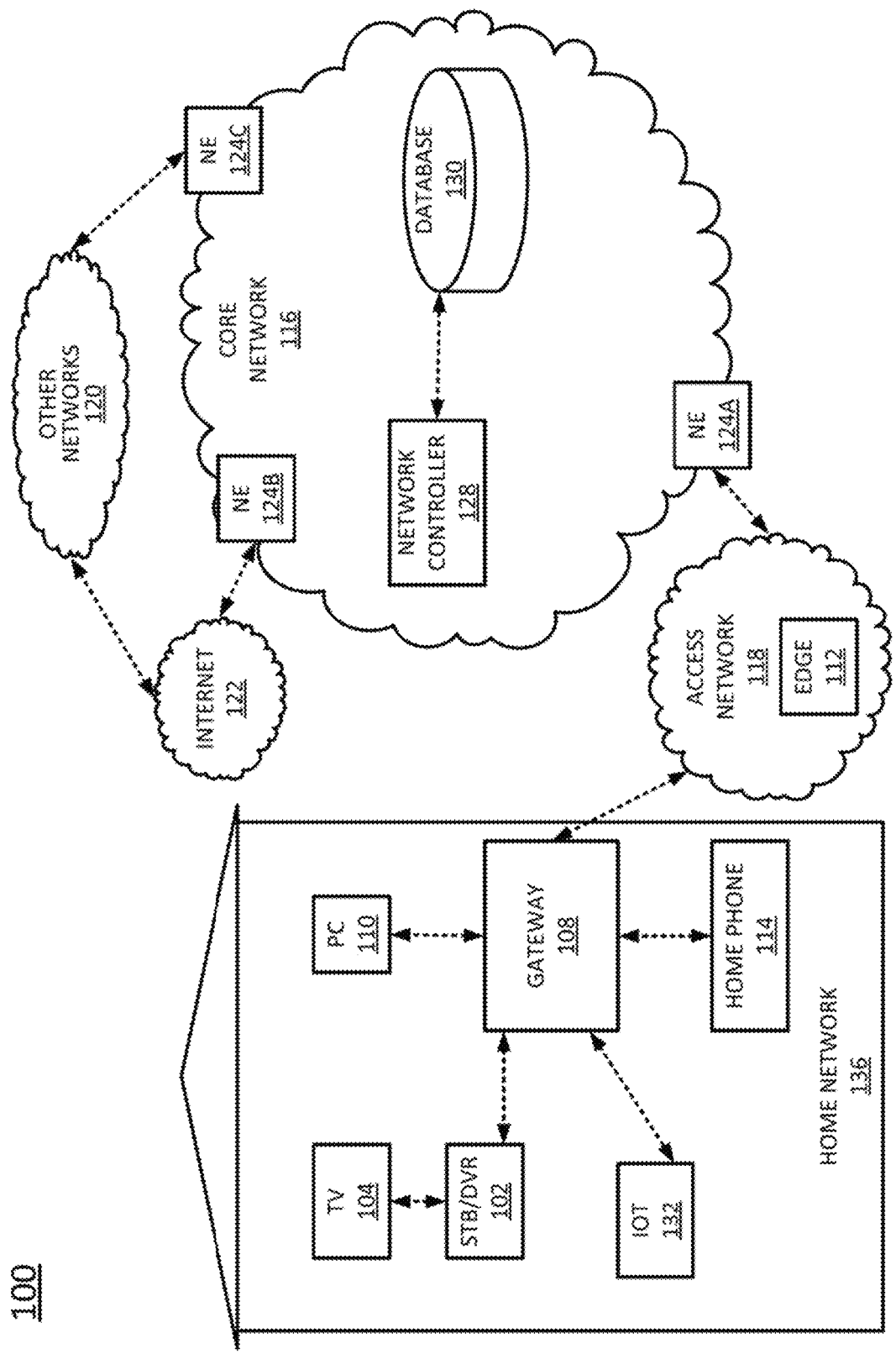
FIG. 1 illustrates an example network related to the present disclosure.

In one example, the present disclosure provides a system, method, and non-transitory computer readable medium for minimizing customer impact during network access migrations. Network service providers are continuously trying to optimize network performance in order to improve customer quality of experience (QoE) while also reducing the costs of providing high quality service. Occasionally, network optimization may involve an access migration in which network access is migrated from old equipment to new equipment, normally in bulk for many customers at once (also referred to as a "bulk migration"). The migration may be part of an upgrade or an add-on to a network system. Examples of bulk access migrations may include Ethernet access tail migrations and network-to-network interface (NNI) migrations. These types of migrations may involve moving hundreds of customers that include thousands of circuits and Ethernet virtual connections (EVCs).

Although the access migration may ultimately result in a better quality of experience for customers, temporarily, the access migration may present an inconvenience to customers. For instance, access migration typically requires changing a customer's wide area network (WAN) Internet Protocol (IP) address (i.e., the IP address that a router at the customer premises uses to connect to the Internet, which is assigned by the customer's Internet service provider (ISP) and may also referred to as the "public IP address" or "external IP address"). The access migration may also require changing the customer configuration (e.g., WAN settings). For instance, for IP version 4 (IPv4), WAN settings may include settings for physical port, network addressing mode, domain name system server source, media access control (MAC) address source, and other settings. For IP version 6 (IPv6), WAN settings may include settings for a static IP address or stateless address auto-configuration (SLAAC), length of IPv6 subnet prefix, default gateway for the ISP, and other settings. During change of the WAN IP address and customer configuration, the customer may be unable to access the Internet, and this downtime can lead to dissatisfaction with the ISP.

Examples of the present disclosure minimize customer impact during network access migrations by preserving the customer's WAN IP. In one example, customer premises may maintain the connection to the same network layer 3 (L3) equipment during an access migration, eliminating the need to change the customer WAN IP address. If, however, the connection to the same L3 equipment cannot be maintained, then exception routes may be created in the new L3 equipment at the time of activation of the new L3 equipment, rather than during pre-configuration of the new L3 equipment. Timing creation of the exception routes in this manner may allow the customer's WAN IP address to be preserved. The exception route may involve configuring the customer's WAN IP address on the new L3 equipment (e.g., such that the WAN IP address is "borrowed"). In a further example, when the new L3 equipment is decommissioned (i.e., no longer in use), or when the new L3 equipment remains in use but the customer circuit is disconnected from the new L3 equipment (e.g., because the customer no longer needs or wants the service), the WAN IP address may be returned to the equipment or subnet from which the WAN IP address was originally borrowed.

By preserving the customer's WAN IP address whenever possible, access migrations involving layer 2 (L2), layer 3 (L3), and layer 4 (L4) moves can be carried out with minimal impact to or downtime for the customer. These and other aspects of the present disclosure are discussed in further detail with reference to FIGS. 1-5, below.

To better understand the present disclosure, FIG. 1 illustrates an example system 100 related to the present disclosure. As shown in FIG. 1, the system 100 may comprise a network 116, e.g., a telecommunication service provider network, a core network, or an enterprise network comprising infrastructure for computing and communications services of a business, an educational institution, a governmental service, or other enterprises. The network 116 may be in communication with one or more access networks (e.g., access network 118), other networks 120, and the Internet 122. In one example, network 116 may combine core network components of a cellular network with components of a triple play service network; where triple-play services include telephone services, Internet or data services and television services to subscribers. For example, network 116 may functionally comprise a fixed mobile convergence (FMC) network, e.g., an IP Multimedia Subsystem (IMS) network. In addition, network 116 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 116 may further comprise a broadcast television network, e.g., a traditional cable provider network or an internet Protocol Television (IPTV) network, as well as an Internet Service Provider (ISP) network. In one example, network 116 may include a plurality of television (TV) servers (e.g., a broadcast server, a cable head-end), a plurality of content servers, an advertising server (AS), an interactive TV/video on demand (VoD) server, and so forth.

In one example, the access network 118 may comprise a broadband optical and/or cable access network, a Local Area Network (LAN), a wireless access network (e.g., an IEEE 802.11/Wi-Fi network and the like), a cellular access network, a Digital Subscriber Line (DSL) network, a public switched telephone network (PSTN) access network, a $3^{rd}$ party network, and the like. For example, the operator of network 116 may provide a cable television service, an IPTV service, or any other types of telecommunication service to subscribers via access network 118. In one example, the network 116 may be operated by a telecommunication network service provider. The network 116 and the access network 118 may be operated by different service providers, the same service provider or a combination thereof, or may be operated by entities having core businesses that are not related to telecommunications services, e.g., corporate, governmental or educational institution LANs, and the like. As shown in FIG. 1, the network 116 may also include a network controller 128 and a database 130. For ease of illustration, various additional elements of core network 116 are omitted from FIG. 1.

In accordance with the present disclosure, network 116 may include a network controller 128, which may comprise a computing system or server, such as computing system 500 depicted in FIG. 5, and may be configured to provide services minimizing customer impact during network access migrations, as discussed in further detail below. The network 116 may also include at least one database (DB) 130 that is communicatively coupled to the network controller 128. For instance, an network controller 128 may provide a service that manages wide area network (WAN) Internet Protocol (IP) addresses and network provisioning as a means of minimizing disruptions to service, and the DB 130 may track information such as equipment and subnet deployment that the network controller 128 may use to manage the WAN IP addresses and network provisioning.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. and discussed below) or multiple computing devices collectively configured to perform various steps, functions, and/or operations in accordance with the present disclosure. Thus, it should be noted that any number of network controllers and any number of databases may be deployed in the network 116. Furthermore, these network controllers and databases may operate in a distributed and/or coordinated manner as a processing system to perform operations in connection with the present disclosure.

Figure 5:
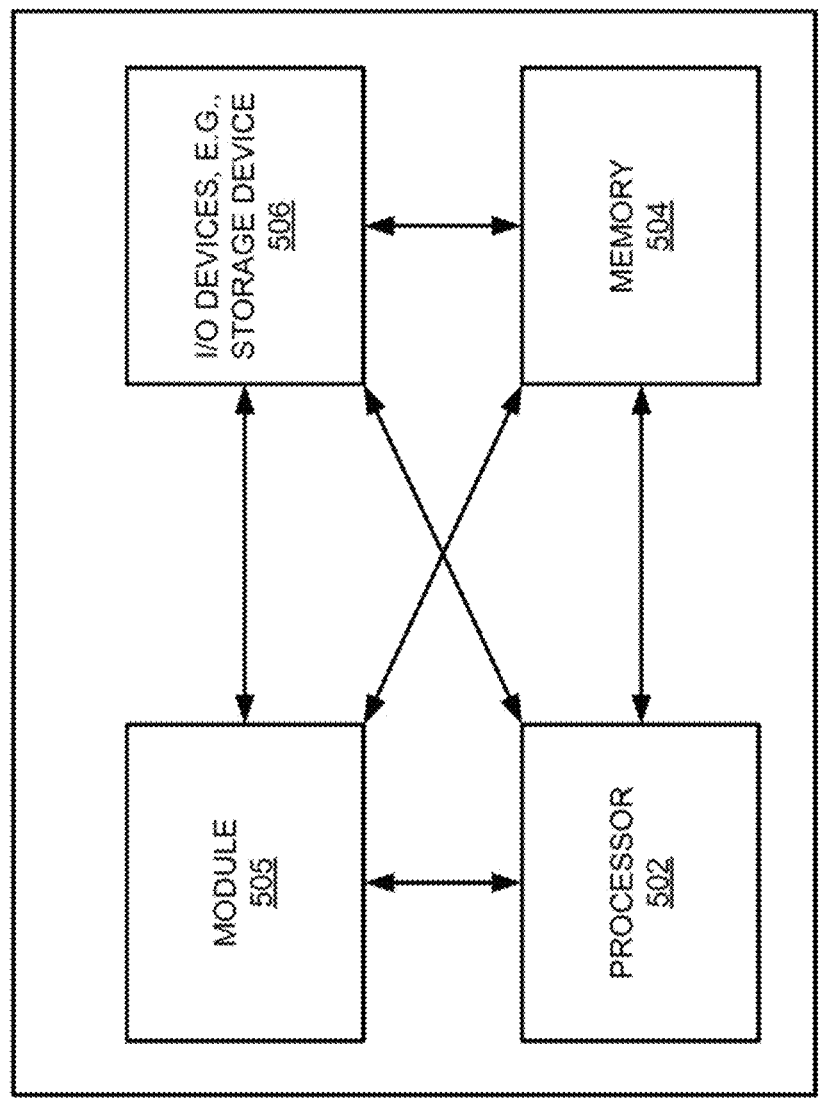
FIG. 5 depicts a high-level block diagram of a computing device specifically programmed to perform the functions described herein.

In one example, access network 118 may include an edge server 112, which may comprise a computing system or server, such as computing system 500 depicted in FIG. 5, and may be configured to provide any of the services provided by the network controller 128.

In one example, the network controller 128 may comprise a network function virtualization infrastructure (NFVI), e.g., one or more devices or servers that are available as host devices to host virtual machines (VMs), containers, or the like comprising virtual network functions (VNFs). In other words, at least a portion of the network 116 may incorporate software-defined network (SDN) components. Similarly, in one example, access network 118 may comprise an "edge cloud," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 118 comprises a radio access network, the nodes and other components of the access network 118 may be referred to as a mobile edge infrastructure. As just one example, edge server 112 may be instantiated on one or more servers hosting virtualization platforms for managing one or more virtual machines (VMs), containers, microservices, or the like. In other words, in one example, edge server 112 may comprise a VM, a container, or the like.

In one example, home network (or customer premises) 136 may include a gateway device 108 (e.g., a residential gateway), which receives streams of data associated with different types of media, e.g., television, phone, and Internet, and separates these communications for the appropriate digital devices to which the gateway device 108 is connected. The streams of data may be received via access network 118, for instance. In one example, television data files are forwarded to a smart television (TV) 104 to be decoded, recorded, and/or displayed. Similarly, Internet communications are sent to and received from gateway device 108, which may be capable of both wired and/or wireless communication. In turn, gateway device 108 receives streams of data from and sends streams of data to the appropriate devices, e.g., personal computer (PC) 110, home phone 114, Internet of Things (IoT) devices 132, and/or other devices. Each of these devices may be configured to support media content of particular file formats. TV 104 may also be configured to support media content of particular file formats. In one example, gateway device 108 may comprise a wired Ethernet router and/or an Institute for Electrical and Electronics Engineers (IEEE) 802.11 (Wi-Fi) router, and may communicate with respective devices in the home network 136 via wired and/or wireless connections.

In one example, the network controller 128 may be configured to perform functions in connection with examples of the present disclosure for minimizing customer impact during network access migrations. For instance, when an Internet service provider (ISP) makes changes in the access network 118 that necessitate a bulk migration of customers, the network controller 128 may perform operations in order to minimize the downtime (or time without access to the Internet 122) that those customers may experience as a result of the migration.

In one example, the network controller 128 may, for each customer premises, attempt to preserve a connection to an existing provider edge router in the system 100 (e.g., rather than connect the customer premises to a new provider edge router). There are a number of ways in which the connection to the existing provider edge router may be preserved (discussed in further detail below). However, preserving the connection to the existing provider edge router means that the WAN IP address associated with the customer premises may also be preserved (e.g., a WAN IP address assigned to the gateway 108 of the home network 136).

In some examples, it may not be possible for the network controller 128 to preserve a connection to the existing provider edge router. That is, the network controller 128 may not be able to avoid connecting the customer premises to a new provider edge router. In this case, the network controller 128 may create an exception route on the new provider edge router at the time of activation of the new provider edge router (e.g., as opposed to during pre-configuration of the new provider edge router). Configuring the exception route in this manner may allow the WAN IP address to be preserved while connecting to the customer premises to the new provider edge router. In a further example, the network controller 128 may track the original provider edge router and subnet to which the customer premises was connected, where the tracking may rely on information stored in the DB 130. Then, when the new provider edge router is decommissioned or removed from service, the WAN IP address may be rolled without the need for reclamation and traffic interruption.

It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, core network 116 is not limited to an IMS network. Similarly, the present disclosure is not limited to an IP/MPLS network for VoIP telephony services, or any particular type of broadcast television network for providing television services, and so forth.

Figure 2:
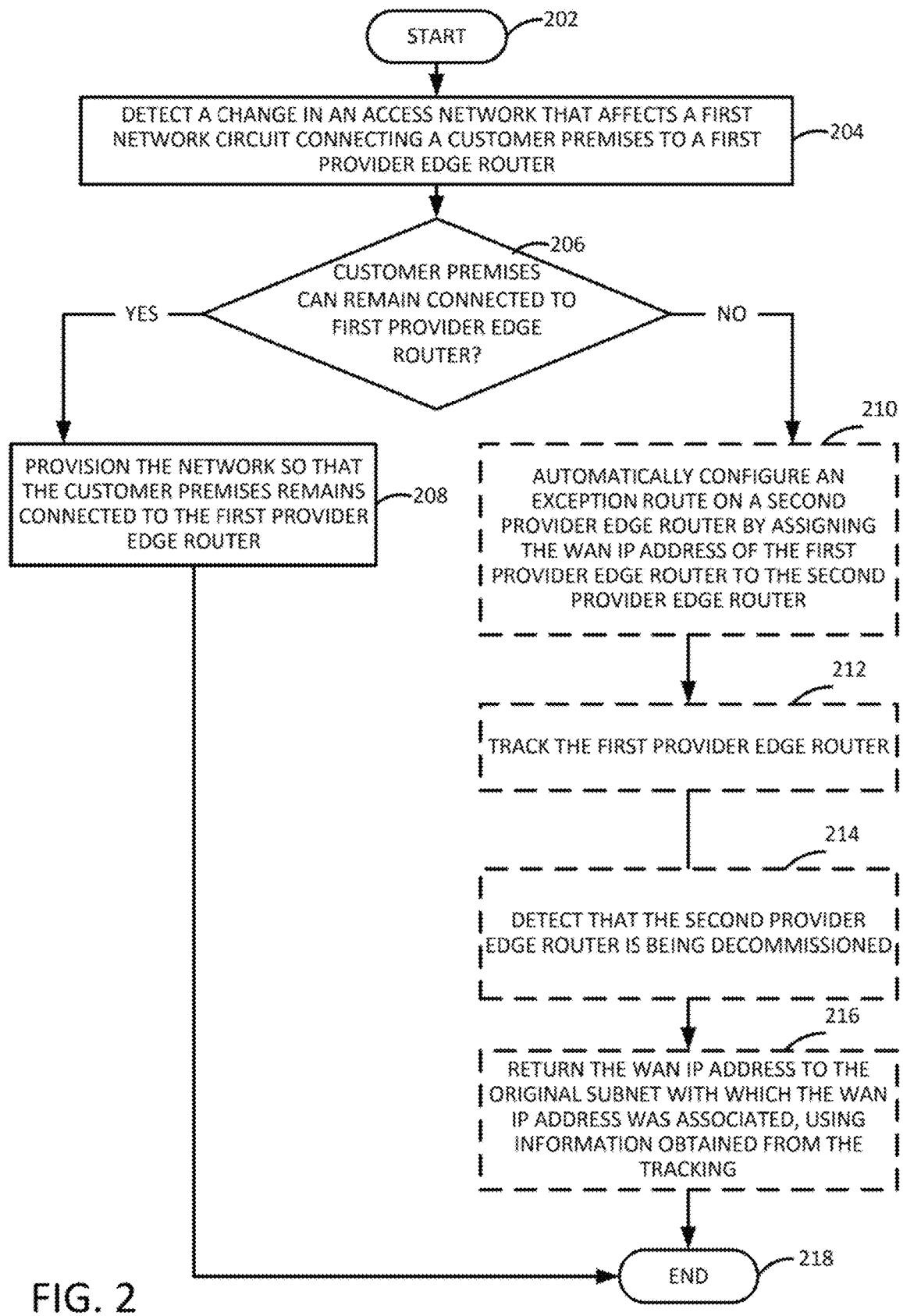
FIG. 2 illustrates a flowchart of an example method for minimizing customer impact during network access migrations, according to the present disclosure.

To further aid in understanding the present disclosure, FIG. 2 illustrates a flowchart of an example method 200 for minimizing customer impact during network access migrations. In one example, the method 200 may be performed by the network controller 128 illustrated in FIG. 1. However, in other examples, the method 200 may be performed by another device, such as the computing system 500 of FIG. 5, discussed in further detail below. For the sake of discussion, the method 200 is described below as being performed by a processing system (where the processing system may comprise a component of the network controller 128, the computing system 500, or another device).

The method 200 begins in step 202. In step 204, the processing system may detect a change in an access network that affects a first network circuit connecting a customer premises to a first provider edge router. In one example, the change in the access network may comprise a change from the access network of one network service provider to the access network of another network service provider (e.g., AT&T® to a third party, third party to third party, etc.). In another example, the change in the access network may comprise a change to the hardware and/or configuration of the current access network. For instance, the network service provider who operates the access network may replace certain network hardware in order to upgrade the Internet speed that is available to the customer premises (e.g., from one Gigabit per second or Gbps to ten Gbps).

In either case, the change in the access network may require that the customer premises disconnect from the first provider edge router and connect to a second, different provider edge router (as well as, potentially, a further reconfiguration of the first circuit to connect to a new customer edge and/or new intermediate routers between the customer premises and the second provider edge router), which in turn requires a change in the wide area network (WAN) Internet Protocol (IP) address of the customer premises on the circuit. However, the subsequent steps of the method 200 attempt to preserve the customer premises connection to the same provider edge router.

In step 206, the processing system may determine whether the change in the access network can be provisioned so that the customer premises remains connected to the first provider edge router (i.e., the same provider edge router that the customer premises was connected to prior to the change in the access network). As discussed above, if the customer premises must connect to a new (second) provider edge router as a result of the change in the access network, then the WAN IP address and the configuration of the customer premises must typically also change, resulting in downtime that can impact the customer quality of experience.

If the processing system determines in step 206 that the change in the access network can be provisioned so that the customer premises remains connected to the first provider edge router (i.e., the same provider edge router that the customer premises was connected to prior to the change in the access network), then the method 200 proceeds to step 208.

In step 208, the processing system may provision the network so that the customer premises remains connected to the first provider edge router (i.e., the provider edge router does not change). In one example, smart homing and engineering algorithms are utilized to optimize the L3 equipment selection so that the customer premises remains connected to the first provider edge router. FIGS. 3A-3E illustrate examples of how such smart homing and engineering algorithms might operate to preserve the connection of the customer premises to the first provider edge router. For instance, where a smart homing algorithm detects an Ethernet access tail migration (EATM) or network-to-network interface (NNI) migration, the smart algorithm may attempt to work backwards. In other words, instead of connecting a customer edge router to an intermediate router to a provider edge router, for instance, the smart homing algorithm may start at the first provider edge router and work backward to see what intermediate and/or customer edge routers could be connected to allow the first provider edge router to be preserved. In a further example, automation of L2 and L3 assignment protocols may also ensure that the customer premises remains connected to the first provider edge router.

Figure 3A:
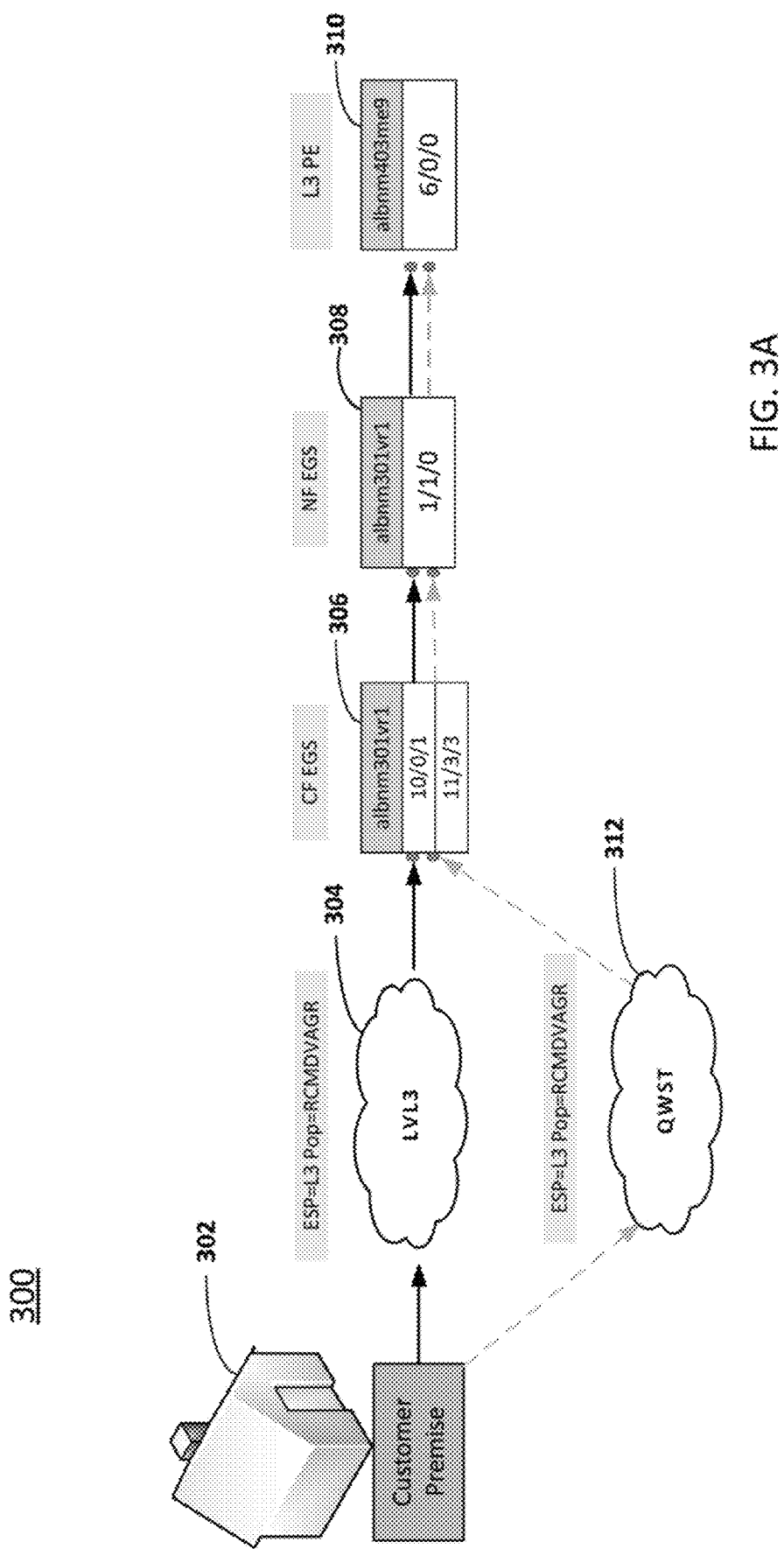
FIG. 3A illustrates a segment of an example network in which the access network to which a customer premises connects is changed, but the provider edge router connected to the customer premises remains the same.

FIG. 3A, for instance, illustrates a segment 300 of an example network in which the access network to which a customer premises connects is changed, but the provider edge router connected to the customer premises remains the same.

In particular, the solid lines show the connections of an original (or source) circuit comprising a customer premises 302, a first access network 304, a customer edge router 306, an intermediate router 308, and a provider edge router 310. The dashed lines show the connections of a new (or target) circuit comprising the customer premises 302, a second access network 312, the customer edge router 306, the intermediate router 308, and the provider edge router 310. Thus, the only thing that changes in the example of FIG. 3A is the access network; all other connections and components, including the provider edge router 310, are preserved.

Figure 3B:
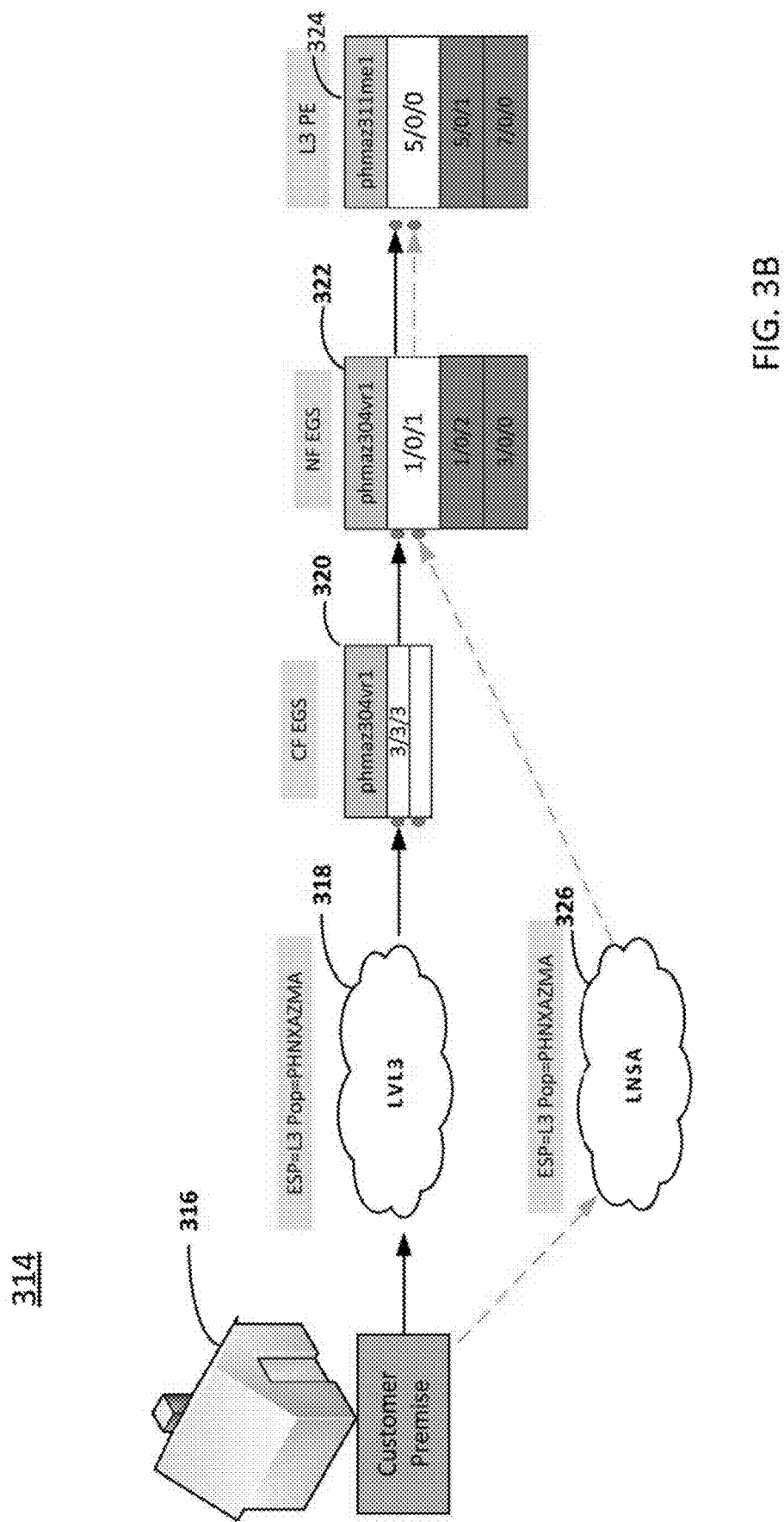
FIG. 3B illustrates a segment of an example network in which the access network to which a customer premises connects is changed, but the provider edge router connected to the customer premises remains the same.

FIG. 3B illustrates a segment 314 of an example network in which the access network to which a customer premises connects is changed, but the provider edge router connected to the customer premises remains the same.

In particular, the solid lines show the connections of an original (or source) circuit comprising a customer premises 316, a first access network 318, a customer edge router 320, an intermediate router 322, and a provider edge router 324. The dashed lines show the connections of a new (or target) circuit comprising the customer premises 316, a second access network 326, the intermediate router 322, and the provider edge router 324. In this example, not only does the access network change, but the new circuit also bypasses the customer edge router 320; all other connections and components, including the provider edge router 324, are preserved.

Figure 3C:
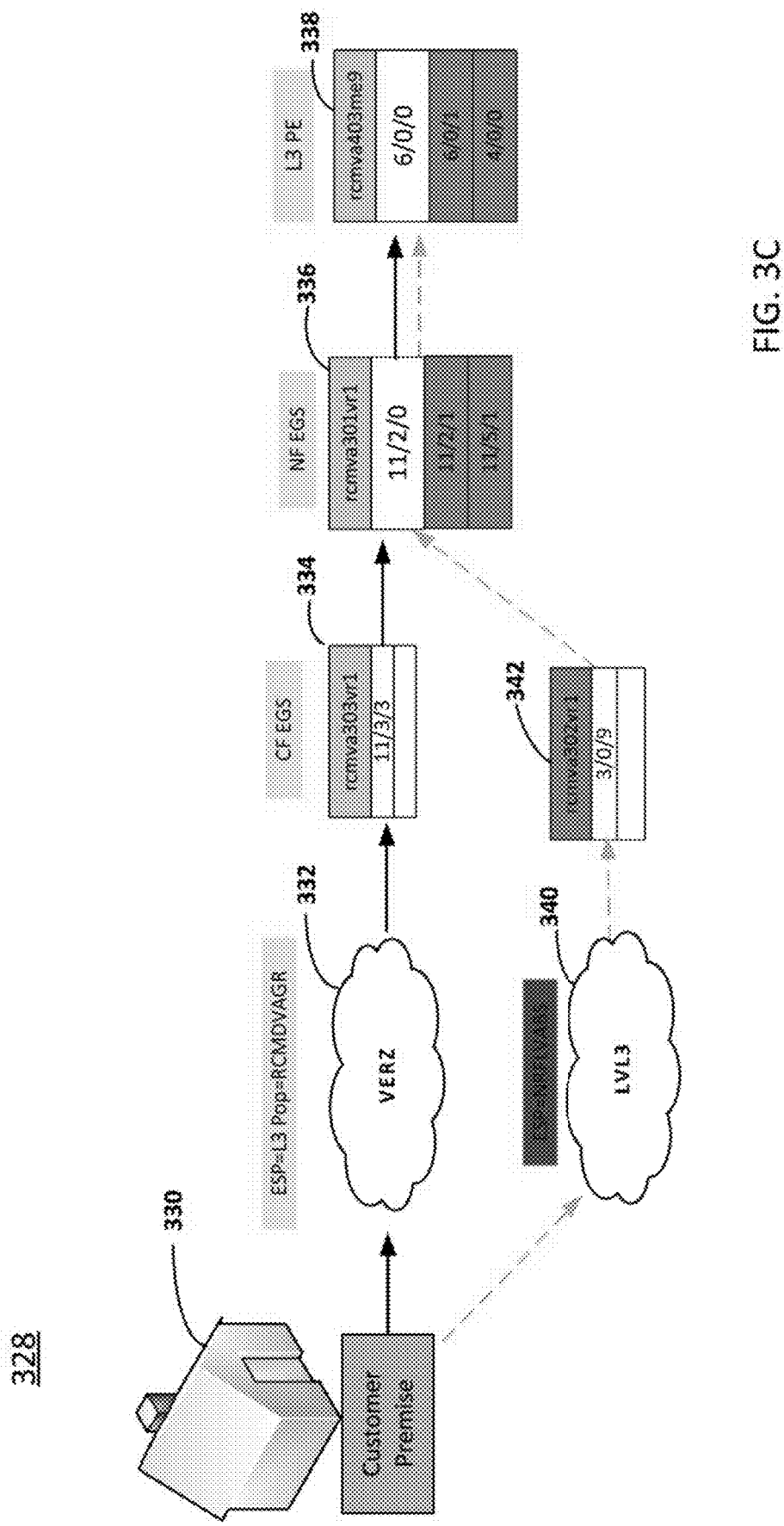
FIG. 3C illustrates a segment of an example network in which the access network and the customer edge router to which a customer premises connects are changed, but the provider edge router connected to the customer premises remains the same.

FIG. 3C illustrates a segment 328 of an example network in which the access network and the customer edge router to which a customer premises connects are changed, but the provider edge router connected to the customer premises remains the same.

In particular, the solid lines show the connections of an original (or source) circuit comprising a customer premises 330, a first access network 332, a first customer edge router 334, an intermediate router 336, and a provider edge router 338. The dashed lines show the connections of a new (or target) circuit comprising the customer premises 330, a second access network 340, a second customer edge router 342, the intermediate router 336, and the provider edge router 338. In this example, both the access network and the customer edge router change; all other connections and components, including the provider edge router 338, are preserved.

Figure 3D:
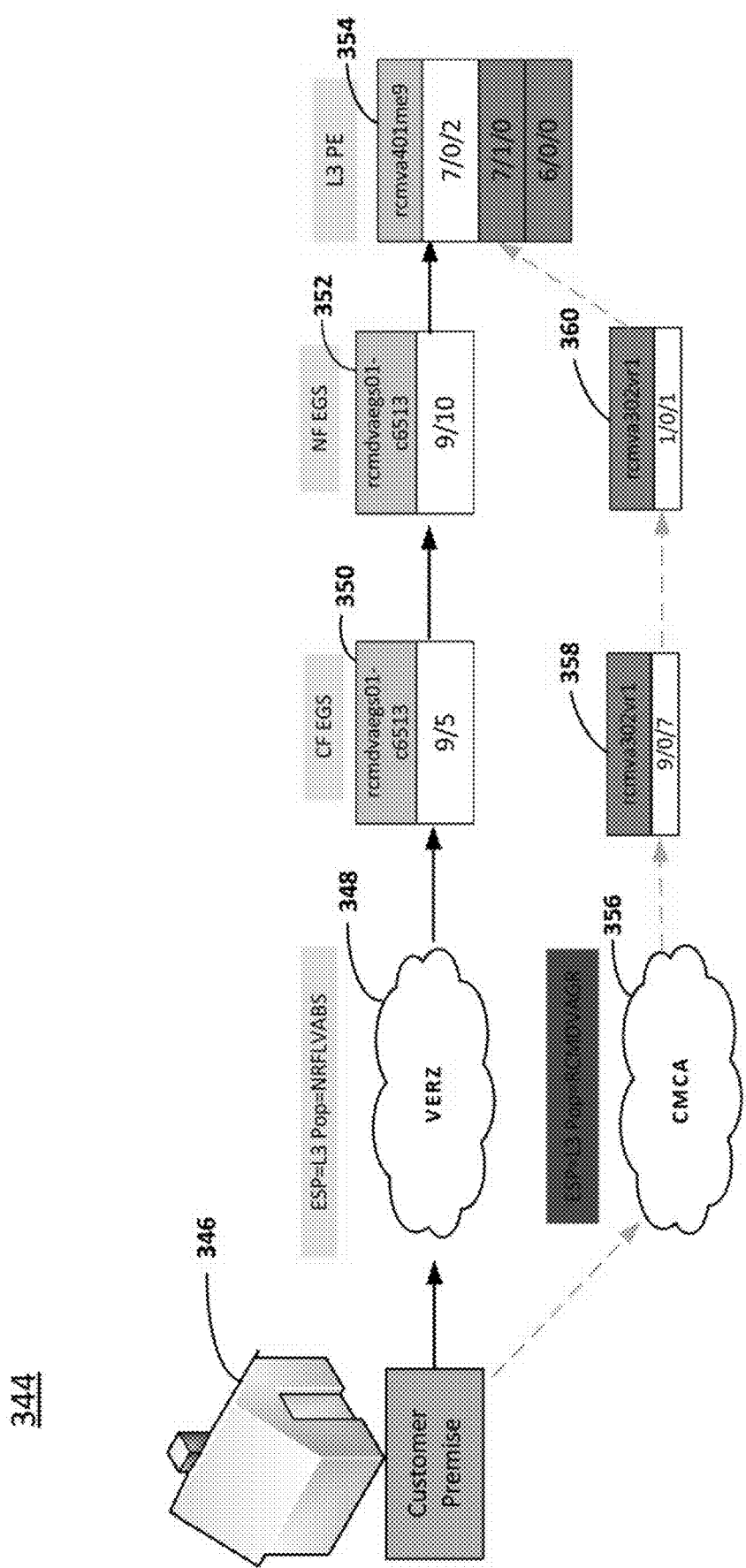
FIG. 3D illustrates a segment of an example network in which the access network, the customer edge router, and the intermediate router to which a customer premises connects are changed, but the provider edge router connected to the customer premises remains the same.

FIG. 3D illustrates a segment 344 of an example network in which the access network, the customer edge router, and the intermediate router to which a customer premises connects are changed, but the provider edge router connected to the customer premises remains the same.

In particular, the solid lines show the connections of an original (or source) circuit comprising a customer premises 346, a first access network 348, a first customer edge router 350, a first intermediate router 352, and a provider edge router 354. The dashed lines show the connections of a new (or target) circuit comprising the customer premises 346, a second access network 356, a second customer edge router 358, a second intermediate router 360, and the provider edge router 354. In this example, the access network, the customer edge router, and the intermediate router all change; only the provider edge router 354 is preserved.

Figure 3E:
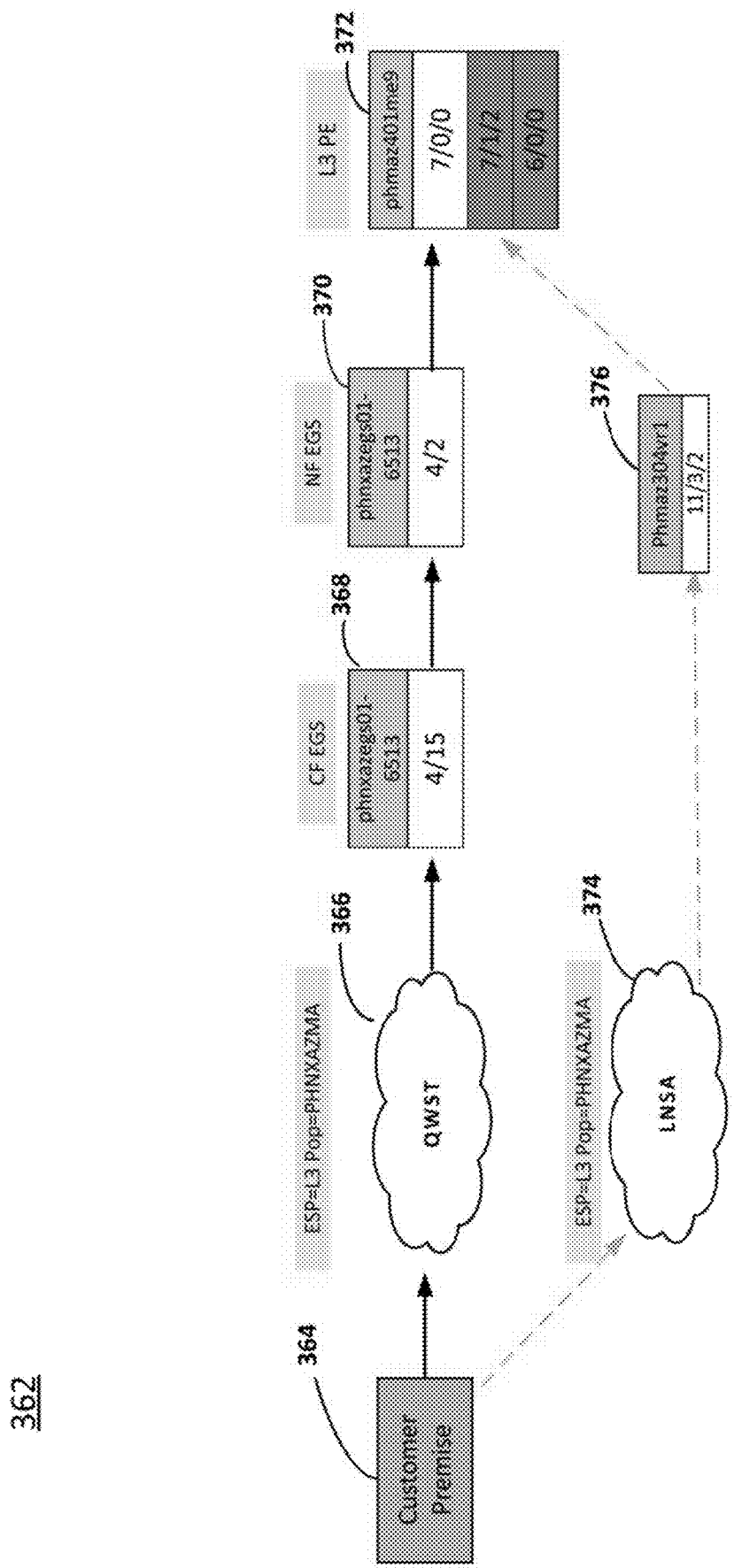
FIG. 3E illustrates a segment of an example network in which the access network and the intermediate router to which a customer premises connects are changed, but the provider edge router connected to the customer premises remains the same.

FIG. 3E illustrates a segment 362 of an example network in which the access network and the intermediate router to which a customer premises connects are changed, but the provider edge router connected to the customer premises remains the same.

In particular, the solid lines show the connections of an original (or source) circuit comprising a customer premises 364, a first access network 366, a first customer edge router 368, a first intermediate router 370, and a provider edge router 372. The dashed lines show the connections of a new (or target) circuit comprising the customer premises 364, a second access network 374, a second intermediate router 376, and the provider edge router 372. In this example, the access network and the intermediate router change and the customer edge router are bypassed; only the provider edge router 372 is preserved.

Thus, FIGS. 3A-3E illustrate various ways in which a customer premises' connection to a specific provider edge router may be preserved when there is a change in the access network that connects the customer premises to the provider edge router.

Referring back to FIG. 2, if the processing system determines in step 206 that the change in the access network cannot be provisioned so that the customer premises remains connected to the first provider edge router (i.e., the same provider edge router that the customer premises was connected to prior to the change in the access network; in other words, a connection to a new provider edge router is necessary), then the method 200 may proceed to optional step 210 (illustrated in phantom).

In step 210, the processing system may automatically configure an exception route on a second provider edge router (different from the first provider edge router) by assigning the WAN IP address of the first provider edge router to the second provider edge router. In one example, automatically configuring the exception route on the second provider edge router may involve configuring the exception route during activation of the second provider edge router (rather than before configuration of the second provider edge router, as is conventional) in order to minimize the chances of a collision.

Figure 4A:
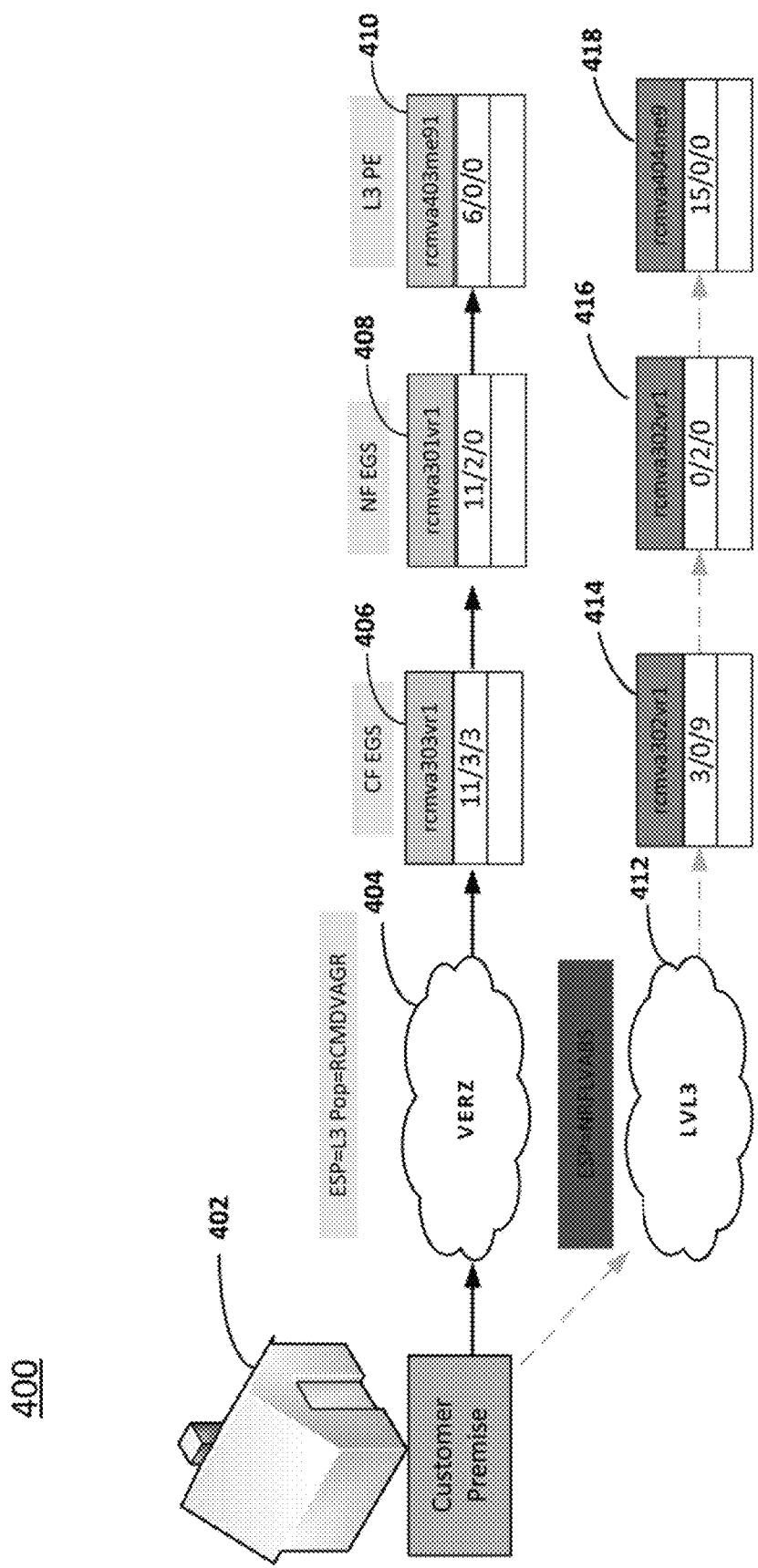
FIG. 4A illustrates a segment of an example network in which the access network and the provider edge router to which a customer premises connects are changed, necessitating the automation of an exception route on the new provider edge router.

FIG. 4A, for instance, illustrates a segment 400 of an example network in which the access network and the provider edge router to which a customer premises connects are changed, necessitating the automation of an exception route on the new provider edge router.

In particular, the solid lines show the connections of an original (or source) circuit comprising a customer premises 402, a first access network 404, a first customer edge router 406, a first intermediate router 408, and a provider edge router 410. The dashed lines show the connections of a new (or target) circuit comprising the customer premises 402, a second access network 412, a second customer edge router 414, a second intermediate router 416, and a second provider edge router 418. In this example, all elements of the circuit except for the customer premises 402 are changed as a result of the migration, and the WAN IP address of the first provider edge router 410 is assigned to the second provider edge router 418.

In some examples, it may not be possible to configure the exception route on the second provider edge router that allows the WAN IP address to be preserved. For instance, a maximum number of exception routes may already be configured on the second provider edge router, or other issues in provisioning may be encountered. In such a case, customer downtime (as the customer circuit is provisioned with a new provider edge router and WAN IP address) may be unavoidable.

In optional step 212 (illustrated in phantom), the processing system may track the first provider edge router (i.e., the provider edge router that the customer premises was connected to prior to the change in the access network). In one example, the first provider edge router may be tracked and stored or re-read through a flat file, in a spreadsheet, in a database, in a message queue, or in the cloud. In further examples, other techniques for tracking the first provider edge router could be used. The key in step 212 is to remember the WAN IP address in conjunction with the source resource that the WAN IP address was attached to prior to creating the exception route, so that the WAN IP address can be returned to the source resource at a later time, as discussed in further detail below. IP addresses are critical resources in limited supply, and allowing IP addresses to become stranded can be costly.

In optional step 214 (illustrated in phantom), the processing system may detect that the second provider edge router is being decommissioned. For instance, the processing system may send periodic queries to the second provider edge router, and may verify continuing operation of the second provider edge router when the second provider edge router responds to the queries (or, conversely, may assume that the second provider edge router has been decommissioned when the second provider edge router fails to respond to the queries). Alternatively, the processing system may determine that a second (new) circuit including the customer premises no longer includes the second provider edge router or that the second circuit has been disconnected.

Figure 4B:
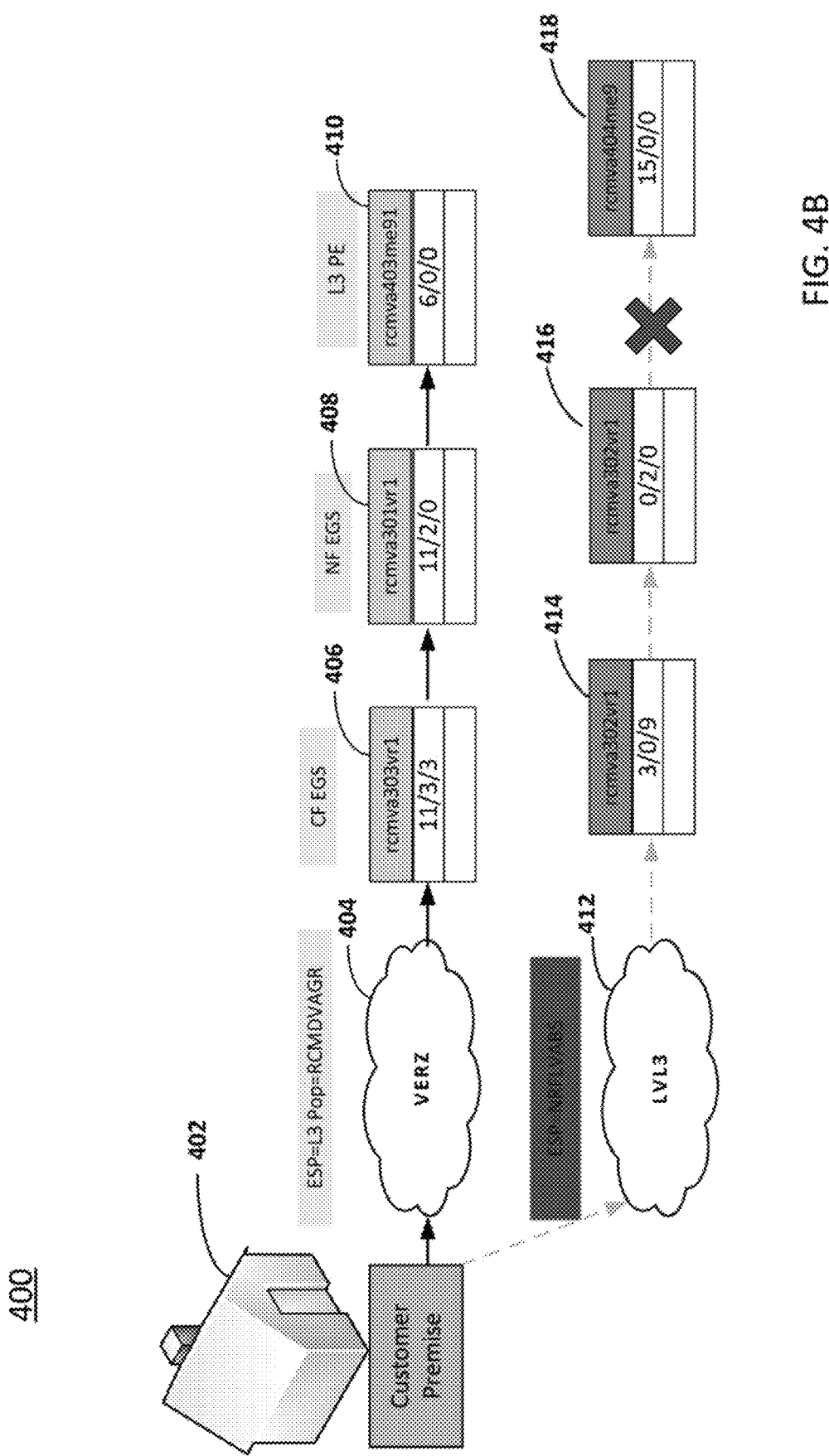
FIG. 4B illustrates the segment of the example network illustrated in FIG. 4A, wherein the second provider edge router has been decommissioned.

FIG. 4B, for instance, illustrates the segment 400 of the example network illustrated in FIG. 4A, wherein the second provider edge router 418 has been decommissioned (as shown by the X breaking the link between the second intermediate router 416 and the second provider edge router 418.

In optional step 216 (illustrated in phantom), the processing system may return the WAN IP address to the original subnet with which the WAN IP address was associated, using information obtained from the tracking. That is, the information obtained from the tracking performed in step 212 may help the processing system to locate the first provider edge router (i.e., the provider edge router that the customer premises was connected to prior to the change in the access network), so that the WAN IP address can be returned to first provider edge router. In one example, the WAN IP address may be returned directly to the first provider edge router from which the WAN IP address was borrowed or reassigned. However, if the first provider edge router is no longer active, then the WAN IP address may simply be returned to the subnet with which the first provider edge router was associated.

In one example, the WAN IP address may be returned to the original subnet using a rollback algorithm. Selection of the exact rollback algorithm that is employed may depend upon how the WAN IP address was tracked and how re-allocation is implemented. Returning the WAN IP address to the original subnet may eliminate the need for reclamation of the WAN IP address and/or interruption of network traffic in the future. In addition, the exception route that was configured on the second provider edge router may be removed.

After the WAN IP address is returned, method 200 proceeds to step 218. The method may end in step 218.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

Moreover, although steps 210-216 are described as optional, it will be appreciated that whether steps 210-216 are performed depends on whether or not the original provider edge router can be preserved (e.g., as determined in step 206). If the original provider edge router can be preserved, then, in one example, nothing more needs to be done. If, however, the original provider edge router cannot be preserved, then steps 210-216 may become necessary steps to minimize customer impact to the greatest extent possible without preservation of the original provider edge router. In other words, in one example, if the original provider edge router address cannot be preserved, then one or more of steps 210-216 may become mandatory steps. Furthermore, in some examples, the WAN IP address may be reassigned from the original provider edge router to the new provider edge router without tracking the WAN IP address (as discussed in connection with steps 212-216).

Thus, customer impact during network access migrations can be minimized. According to examples of the present disclosure, customers may no longer be forced offline (i.e., lose Internet access or connectivity) during actions initiated by their ISPs. Large migration projects (e.g., 10G migrations, migrations to low-cost ISPs, and other migrations) can be designed and implemented efficiently, saving ISPs potentially millions of dollars. Furthermore, the management of exception routes is simplified and less manually intensive.

FIG. 5 depicts a high-level block diagram of a computing device specifically programmed to perform the functions described herein. For example, any one or more components or devices illustrated in FIG. 1 or described in connection with the method 200 may be implemented as the system 500. For instance, the network controller 128 of FIG. 1 (such as might be used to perform the method 200) could be implemented as illustrated in FIG. 5.

As depicted in FIG. 5, the system 500 comprises a hardware processor element 502, a memory 504, a module 505 for minimizing customer impact during network access migrations, and various input/output (I/O) devices 506.

The hardware processor 502 may comprise, for example, a microprocessor, a central processing unit (CPU), or the like. The memory 504 may comprise, for example, random access memory (RAM), read only memory (ROM), a disk drive, an optical drive, a magnetic drive, and/or a Universal Serial Bus (USB) drive. The module 505 for minimizing customer impact during network access migrations may include circuitry and/or logic for performing special purpose functions relating to minimizing customer impact during network access migrations. The input/output devices 506 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for minimizing customer impact during network access migrations (e.g., a software program comprising computer-executable instructions) can be loaded into memory 504 and executed by hardware processor element 502 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for minimizing customer impact during network access migrations (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   detecting, by a processing system comprising at least one processor, a change in an access network that affects a first network circuit connecting a customer premises to a first provider edge router, wherein the first network circuit comprises a first customer edge router connected to the customer premises via the access network and a first intermediate router connecting the first customer edge router to the first provider edge router; and
   provisioning, by the processing system, a second network circuit to connect the customer premises to the first provider edge router in response to the detecting, wherein the provisioning comprises taking an action to preserve a wide area network internet protocol address assigned to the customer premises so that neither the first provider edge router to which the customer premises is connected nor the wide area network internet protocol address assigned to the customer premises changes when the customer premises is disconnected from the first network circuit and connected to the second network circuit.

2. The method of claim 1, wherein the second network circuit replaces the access network with a new access network operated by an internet service provider that is different from an internet service provider operating the access network, such that the second network circuit does not pass through the access network.

3. The method of claim 2, wherein the second network circuit further comprises a bypass of the first customer edge router, such that the customer premises is connected to the first intermediate router via the new access network, and the second network circuit does not pass through the first customer edge router.

4. The method of claim 3, wherein the second network circuit further replaces the first intermediate router with a second intermediate router that was not part of the first network circuit.

5. The method of claim 2, wherein the second network circuit further replaces the first customer edge router with a second customer edge router, such that the new access network is connected to the first intermediate router via the second customer edge router, and the second network circuit does not pass through the first customer edge router.

6. The method of claim 5, wherein the second network circuit further replaces first intermediate router with a second intermediate router, such that the second customer edge router is connected to the provider edge router via the second intermediate router, and the second network circuit does not pass through the first intermediate router.

7. The method of claim 1, wherein the change in the access network comprises a change to a hardware component of the access network.

8. The method of claim 1, wherein the change in the access network comprises a change to a configuration of the access network.

9. The method of claim 1, wherein the change in the access network is part of a bulk access migration that migrates access to the access network for a plurality of customer premises including the customer premises from a first set of equipment to a second set of equipment.

10. The method of claim 9, wherein the bulk access migration includes at least one of: a layer 2 move, a layer 3 move, or a layer 4 move.

11. The method of claim 9, wherein the bulk access migration comprises one of: a database schema migration, a migration to a new access network of an internet service provider other than the internet service provider who operates the access network, an Ethernet access tail migration, or a network-to-network interface migration.

12. The method of claim 1, wherein the provisioning employs a homing algorithm that starts at the first provider edge router and works backward to identify at least one of an alternate intermediate router or an alternate customer edge router that would allow the second network circuit to pass from the first provider edge router to the customer premises.

13. A non-transitory computer-readable medium storing instructions which, when executed by a processing system including at least one processor, cause the processing system to perform operations, the operations comprising:
  detecting a change in an access network that affects a first network circuit connecting a customer premises to a first provider edge router, wherein the first network circuit comprises a first customer edge router connected to the customer premises via the access network and a first intermediate router connecting the first customer edge router to the first provider edge router; and
  provisioning a second network circuit to connect the customer premises to the first provider edge router in response to the detecting, wherein the provisioning comprises taking an action to preserve a wide area network internet protocol address assigned to the customer premises so that neither the first provider edge router to which the customer premises is connected nor the wide area network internet protocol address assigned to the customer premises changes when the customer premises is disconnected from the first network circuit and connected to the second network circuit.

14. The non-transitory computer-readable medium of claim 13, wherein the change in the access network comprises a change to a hardware component of the access network.

15. The non-transitory computer-readable medium of claim 13, wherein the change in the access network comprises a change to a configuration of the access network.

16. The non-transitory computer-readable medium of claim 13, wherein the change in the access network is part of a bulk access migration that migrates access to the access network for a plurality of customer premises including the customer premises from a first set of equipment to a second set of equipment.

17. An apparatus comprising:
  a processing system including at least one processor; and
  a computer-readable medium storing instructions which, when executed by the processing system, cause the processing system to perform operations, the operations comprising:
    detecting a change in an access network that affects a first network circuit connecting a customer premises to a first provider edge router, wherein the first network circuit comprises a first customer edge router connected to the customer premises via the access network and a first intermediate router connecting the first customer edge router to the first provider edge router; and
    provisioning a second network circuit to connect the customer premises to the first provider edge router in response to the detecting, wherein the provisioning comprises taking an action to preserve a wide area network internet protocol address assigned to the customer premises so that neither the first provider edge router to which the customer premises is connected nor the wide area network internet protocol address assigned to the customer premises changes when the customer premises is disconnected from the first network circuit and connected to the second network circuit.

18. The apparatus of claim 17, wherein the change in the access network comprises a change to a hardware component of the access network.

19. The apparatus of claim 17, wherein the change in the access network comprises a change to a configuration of the access network.

20. The apparatus of claim 17, wherein the change in the access network is part of a bulk access migration that migrates access to the access network for a plurality of customer premises including the customer premises from a first set of equipment to a second set of equipment.

* * * * *